Jan. 31, 1956  E. A. FUGLIE ET AL  2,733,074
STAIR CLIMBING CART

Filed Sept. 13, 1952  2 Sheets-Sheet 1

INVENTORS
ELMER A. FUGLIE
CARL E. WEINMANN
BY Whiteley & Caine
ATTORNEYS

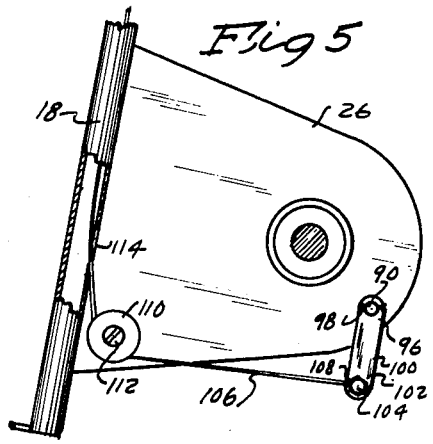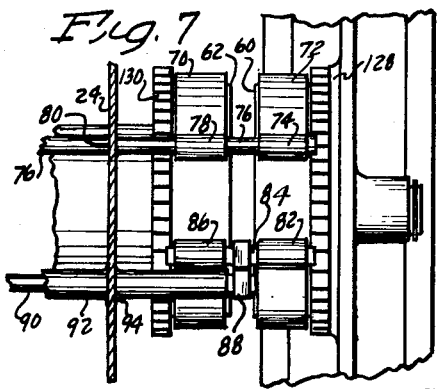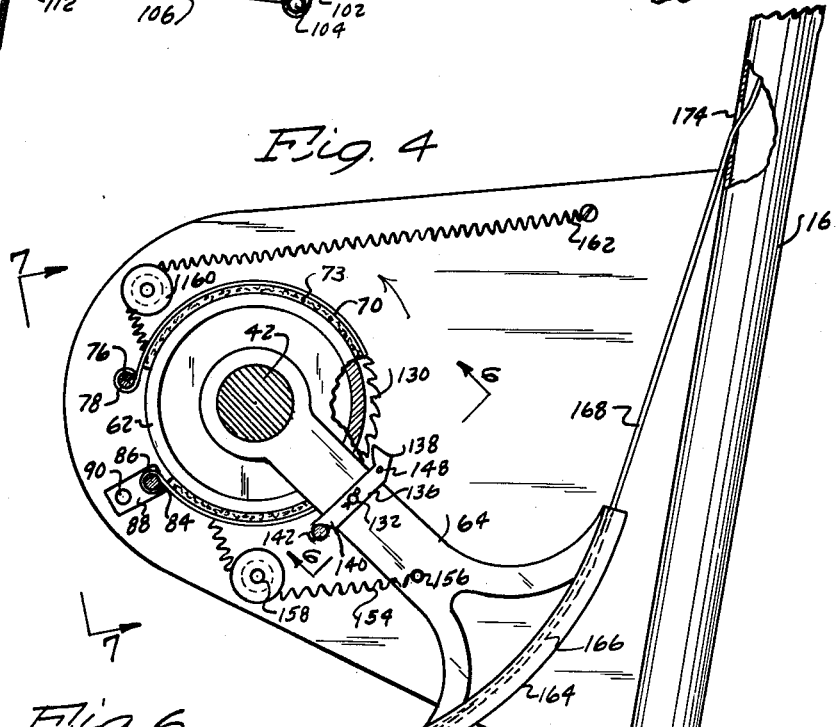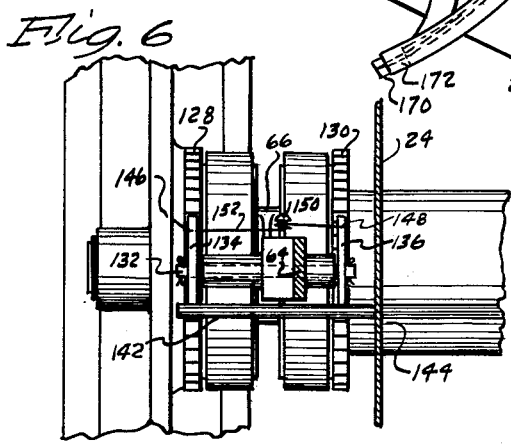
INVENTORS
ELMER A FUGLIE
CARL E. WEINMANN
BY Whiteley & Caine
ATTORNEYS United States Patent Office 2,733,074
Patented Jan. 31, 1956

2,733,074

STAIR CLIMBING CART

Elmer A. Fuglie and Carl E. Weinmann, Winona, Minn.; said Fuglie assignor to Winona Tool Manufacturing Company, Winona, Minn., a partnership Application September 13, 1952, Serial No. 309,412

15 Claims. (Cl. 280—5.2)

Our invention relates to a carrying cart, and in particular to a carrying cart which is adapted to move easily up and down a flight of stairs.

The ordinary hand truck or carrying cart is completely unsatisfactory for transporting goods up and down a flight of stairs. This is particularly true where the load is a heavy one. It is difficult for the operator to keep the cart or truck from running away from him when moving goods down a stairs, and when moving heavy goods up a flight of stairs, the operator is in effect bodily lifting the goods a step at a time.

Our stair climbing cart embodies three novel features. It combines a braking means normally operable upon the rotatable members of the cart for controlling its movement down a flight of stairs, with a novel lever means for actuating the wheels of the cart a step at a time when moving the cart up a flight of stairs. Having leverage means actuating the wheels of the cart makes it possible for a single operator to move a heavier load than would be possible in an ordinary truck or cart and makes moving any type of load up a flight of stairs an easier process. The leverage means actuating the wheels of the cart also makes it possible for the operator to have better control of his cart and the load which he is transporting. The third novel feature of our invention lies in the attachment of the wheels to the axle of the stair-climbing cart. One wheel being independent of the second wheel gives the carrying cart maneuverability which the ordinary truck or cart does not have.

One form of a stair-climbing cart has been illustrated in our prior application, Ser. No. 192,876, filed October 30, 1950. The present application illustrates a modified form of a carrying cart which is less expensive to manufacture and embodies new features which make it more applicable for general usage.

It is an object of the present invention to provide an improved stair-climbing cart.

It is another object of the present invention to provide a stair-climbing cart having two wheels, one wheel secured to the axle of the cart and the second wheel carried by the axle but mounted for free rotation upon said axle, together with means for controlling the movement of the wheels in ascending and descending stairs.

Another object of the present invention is to provide a two-wheeled stair-climbing cart, one wheel secured to the axle of the cart and the second wheel carried by the axle but mounted for free rotation upon said axle, having a braking means operatively connected to each wheel for controlling the cart's movement down a flight of stairs.

Another object of the present invention is to provide a two-wheeled stair-climbing cart, one wheel secured to the axle of the cart and the second wheel carried by the axle but mounted for free rotation upon said axle, having a lever means for actuating the cart's movement up a flight of stairs.

It is a further object of the present invention to provide a new stair climbing cart having one wheel secured to the axle of the cart and having a second wheel carried by the axle but mounted for free rotation thereon, and combining a braking means controlling the cart's movement down a flight of stairs and a lever means for actuating the cart's movement up a flight of stairs.

These and other objects will be disclosed in the course of the following specification and claims, reference being had to the accompanying drawings wherein:

Fig. 4 is a view taken along line 4—4 of Fig. 3, showing the driving mechanism of the stair-climbing cart;

Fig. 5 is a view taken along line 5—5 of Fig. 1, showing a portion of the braking mechanism of the stair-climbing cart;

Fig. 6 is a section view taken along line 6—6 of Fig. 4, showing further a portion of the driving mechanism of the stair-climbing cart;

Fig. 7 is a view taken along line 7—7 of Fig. 4, showing the braking means of the stair-climbing cart.

Figure 1:
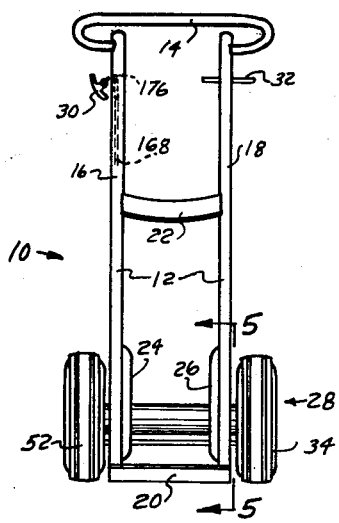
Fig. 1 is a front elevation of the stair-climbing cart.
Figure 2:
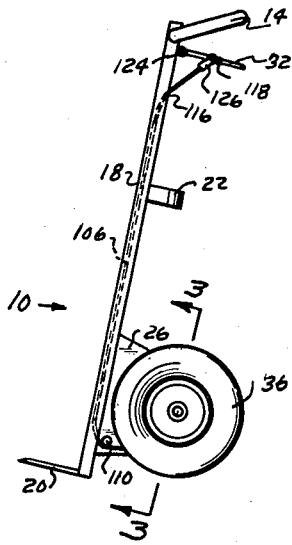
Fig. 2 is a side elevation of the stair-climbing cart shown in Fig. 1.

Referring particularly to Figs. 1 and 2, general reference numeral 10 represents the stair-climbing cart. The frame 12 of the stair-climbing cart 10 consists of a tubular handle 14 welded to parallel, hollow, rod-like members 16 and 18. The rod-like members 16 and 18 extend from the handle 14 to a foot piece 20. Foot piece 20 projects at a right angle from the rod-like members 16 and 18. A support or brace 22 is secured between the rod-like members 16 and 18 midway between handle 14 and the foot piece 20. Flange member 24 secured to the rod-like member 16 and flange member 26 secured to the rod-like member 18 project rearwardly to support the undercarraige of the stair-climbing cart designated by general reference numeral 28.

A lever operating handle 30 is located at the operator's right hand near the top of the rod-like member 16. A brake lever 32 is located at the operator's left hand near the top of the rod-like member 18.

Figure 3:
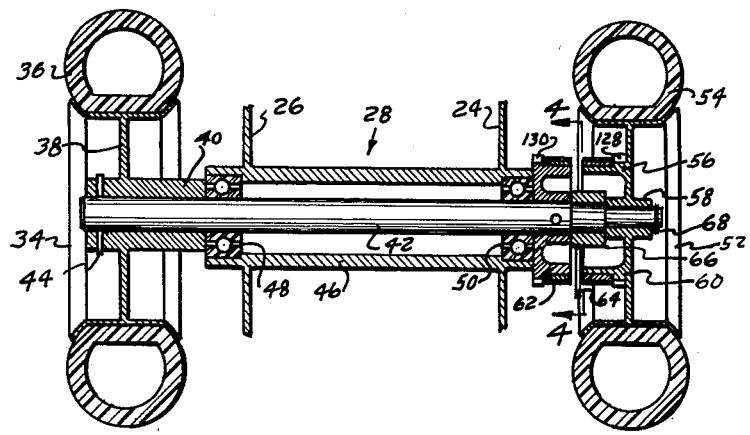
Fig. 3 is a section view along line 3—3 of Fig. 2, showing the undercarriage of the stair-climbing cart.

Fig. 3 gives a better representation of the undercarriage designated by the general reference numeral 28. A rotatable member 34 is depicted at the left of Fig. 3 and comprises a rubber, air-filled tire 36 and a wheel 38, which has a hub 40. Wheel 38 is secured to an axle 42 by means of a pin 44, which passes through the hub 40 and the axle 42. Axle 42 passes from the hub 40 and through a tubular bearing and axle housing 46. Ball bearings 48 and 50 support the axle for rotation relative to the housing 46. A second rotatable member 52 is depicted at the right of Fig. 3 and comprises a rubber, air-filled tire 54 and a wheel 56, which has a hub 58. As wheel 56 is mounted for free rotation upon the axle 42, hub 58 forms a bearing surface with the axle 42. A brake drum 60 is secured to the wheel 56 and will rotate in conjunction therewith. A second brake drum 62 is secured to the axle 42 adjacent to the brake drum 60. A lever 64 has an end 66 which is mounted for free rotation upon the axle 42 and is positioned between the brake drum 60 and the brake drum 62. A snap ring 68 holds wheel 56 in position upon the axle 42.

The braking mechanism of the stair-climbing cart 10 is best described by referring to Figs. 5 and 7. In Fig. 7, brake drum 62, which is secured to the axle 42, is partially encompassed by a brake shoe 70. Likewise drum 60, which is secured to the wheel 56, is partially encompassed by a brake shoe 72. Brake shoes 70 and 72 are metallic strips which carry linings 73, see Fig. 4, for engaging the brake drums. Referring again to Fig. 7, one end 74 of the brake shoe 72 is turned up in a loop to engage a brake anchor rod 76. Similarly, brake shoe 70 is turned up into a loop 78, which is secured to rod 76 adjacent to the connection of loop 74. The brake anchor rod 76 passes through flange 24 at a point 80, at which point it is secured to flange 24, and it extends parallel to the bearing and axle housing 46 to a point of attachment on flange 26. The lower extremity of brake shoe 72 is formed in a loop 82 and encircles a pin 84. Similarly, the lower extremity of brake shoe 70 is formed in a loop 86 and encircles the pin 84. A short lever 88 has one end secured to the center of pin 84 and is operative between the brake shoes 70 and 72. The other end of the short lever 88 is secured to an operating rod 90. Rod 90 extends through a tube 92. The tube 92 like the anchor rod 76 passes through flange 24 at a point 94, at which point it is secured to flange 24, and it extends parallel to the bearing and axle housing 46 to a point of attachment on flange 26. Referring to Fig. 5, operating rod 90 extends through the tube 92 to a point 96 between the flange 26 and the member 34 where it is secured by means of a pin 98 to a lever 100. Lever 100 has a bifurcated end 102 opposite its point of attachment with the rod 90. A brake cable 106 has an end 108 looped around a pin 104. Cable 106 extends from the pin 104 over a pulley 110, which is secured to the flange 26 by means of a bolt 112, and extends through an aperture 114 in the rod-like member 18. The cable then extends within the rod-like member 18 to a point near the handle 14. Referring to Fig. 2, cable 106 passes out through an aperture 116 and is connected to the brake lever 32.

Brake lever 32 consists of a handle 118, which is secured to a projection 124 extending from the rod-like member 18. Secured to the handle 118 is a bifurcated member 126. Cable 106 is secured to the single branch of this bifurcated member 126.

The driving mechanism of the stair-climbing cart is best described by referring to Figs. 3, 4 and 6. Referring first to Fig. 3, but as also shown in Figs. 6 and 7, brake drum 60 has secured on it a gear 128. Similarly, brake drum 62 has secured on it a gear 130. As was previously described, lever 64 is positioned between the brake drum 60 and the brake drum 62 and has its stable end 66 mounted upon the axle 42 for free rotation. Referring now to Fig. 6, lever 64 has extending through it a pin 132. Pivotally mounted on pin 132 are a pawl 134, adapted to engage the gear 128, and a pawl 136, adapted to engage the gear 130. The pawls 134 and 136, as best shown in Fig. 4, consist of a head end 138 which engages the gears 128 and 130 respectively, and a back end 140 which is adapted to engage a stationary stop 142. The stationary stop 142 is a rod which projects through flange 24 at a point 144, Fig. 6, at which point it is secured to flange 24, and extends parallel to the bearing and axle housing 46 to a point of attachment on flange 26. Pawl 134 in the end 138 has an aperture 146, and pawl 136 in the end 138 has an aperture 148. A screw 150 projects from lever 64 and carries a leaf spring 152. The leaf spring 152 extends into the apertures 146 and 148 and biases the pawls 134 and 136 into engagement with their respective gears. Referring now to Fig. 4, a spring 154 has one end 156 secured to the lever 64. The spring 154 extends from end 156 over a pulley 158, which is bolted to the flange 24, and then over a pulley 160, which is likewise bolted to the flange 24, and is anchored at 162 to the flange 24. Lever 64 has an arc-shaped portion 164 which forms a U-shaped channel 166 through which runs a cable 168. Cable 168 is secured at its end 170 to the end 172 of the arc-shaped portion 164, and extends along the channel 166 and through an aperture 174 into the rod-like member 16. Referring now to Fig. 1, it is seen that the cable 168 extends within the rod-like member 16 from the aperture 174 to a second aperture 176 located near the handle 14. Cable 168 emerges from rod-like member 16 at aperture 176 and is secured to the handle 30.

The operation of our invention is as follows. For operation on a level plane, our carrying cart 10 is no different than any other hand truck except that the rotatable member 52 which consists of the tire 54 and the wheel 56, is mounted upon the axle 42 for free rotation. Therefore the rotation of the rotatable member 52 is independent of the rotation of the rotatable member 34, which is secured to the axle 42. The independence of the rotatable members 52 and 34 gives the cart increased maneuverability. The movement of the carrying cart down a flight of stairs is controlled by the braking mechanism. When it is desired to actuate the brakes, an upward movement of the brake handle 118 will cause brake cable 106 to move the lever 100. Any movement of the lever 100 is transferred by means of operating rod 90 to the short lever 88. Therefore an upward movement of the handle 118 causes lever 88 to move and moving in conjunction therewith the pin 84 so that brake shoes 70 and 72, whose other ends are anchored to the brake anchor rod 76, simultaneously move their linings into engagement with the brake drums 62 and 60 respectively. This will stop or retard rotation of the brake drums 62 and 60, as well as rotatable members 56 and 34. The movement of the carrying cart up a flight of stairs is actuated by the driving mechanism. The parts as shown in Fig. 4 are in their normal position. The operator's movement of handle 30 will be transferred by cable 168 to the operating lever 64. Movement of the lever 64 in an upward direction will move the pawls 134 and 136 away from the stationary stop 142. This will allow the leaf spring 152 to move the pawls 134 and 136 into engagement with the gears 128 and 130. Further movement of the lever actuates said pawls to rotate gears 128 and 130 in the direction of the arrow shown in Fig. 4. Movement of the gears 128 and 130 will cause the parts associated with them to be moved, including the rotatable members 34 and 52. When the lever 64 has reached the extremity of movement in the upward direction and the handle 30 is released by the operator, spring 154 will move the lever back to the normal position in Fig. 4. Thus by successive pulling and releasing of the handle 30, the rotatable members 34 and 52 will be moved up a flight of stairs a step at a time. It is known that the extremity of movement of the lever 64 in its upward direction rotates the gears 128 and 130 and with them the rotatable members 34 and 52 a sufficient distance to move the cart up one normal sized step. If by reason of slippage or abnormal sized stairs, the cart has not fully surmounted the step, the brake may be applied to prevent backward movement, and this is possible because of the frictional effect of the large rubber tires.

It will be obvious to those skilled in the art that our invention may be modified by many substitutions and equivalents and that this disclosure is intended to be illustrative only. Therefore, we intend to be limited solely by the scope of the appended claims.

We claim:

1. A stair-climbing cart comprising a frame, an axle carried by said frame, a wheel mounted for free rotation upon said axle, an external gear secured to said wheel, a pawl biased to engage said gear, means carried by said frame and adapted to engage said pawl for normally holding said pawl out of engagement with said gear, a lever connected to said pawl and having one end attached to said axle for movement independent of the movement of said axle, and operating means connected to said lever for moving said lever from an initial position and back to said initial position, said movement of said lever from its initial position moving said pawl from its normal position and allowing the bias of the pawl to move said pawl into engagement with said gear and further actuating said pawl to rotate said gear and said wheel.

2. A stair-climbing cart comprising a frame, an axle carried by said frame, a first gear secured to said axle, a first wheel secured to said axle, a second wheel carried by said axle but whose movement is independent of the movement of said axle, a second gear secured to said second wheel, dependent pawl means for engaging said first and second gears, and means for actuating said pawl means for rotating the wheels of said cart.

3. A stair-climbing cart comprising a frame, an axle carried by said frame, a first gear secured to said axle, a first wheel secured to said axle, a second wheel carried by said axle but whose movement is independent of the movement of said axle, a second gear secured to said second wheel, a pair of pawls each biased to engage one of said gears, means for normally holding said pawls out of engagement with their respective gears, and a lever connected to said pawls and having one end attached to said axle for movement between two positions independent of the movement of said axle, said movement of said lever in one direction moves said pawls from their normal position and allows them to move into engagement with said first and second gears and actuates said pawls for rotating said first and second wheels in the proper direction for moving said cart up a flight of stairs.

4. A stair-climbing cart comprising a frame, an axle carried by said frame, a first gear secured to said axle, a first wheel secured to said axle, a second wheel carried by said axle but whose movement is independent of the movement of said axle, a second gear secured to said second wheel, a pair of pawls each biased to engage one of said gears, means for normally holding said pawls out of engagement with their respective gears, a lever connected to said pawls and having one end attached to said axle for movement between two positions independent of the movement of said axle, said movement of said lever in one direction moves said pawls from their normal position and allows them to move into engagement with said first and second gears and actuates said pawls for rotating said first and second wheels in the proper direction for moving said cart up a flight of stairs, and a brake operative upon said second wheel and upon said axle for controlling the rotation of said first and second wheels in moving said cart down a flight of stairs.

5. A stair-climbing cart comprising a frame, an axle carried by said frame, a wheel mounted for free rotation upon said axle, a gear secured to said wheel, a second gear similar in size and construction to said first namd gear secured to said axle and positioned adjacent to said first named gear, pawls for engaging said gears whose normal position is out of engagement with said gears, means operative only when said cart is moving in reverse for engaging said pawls with said gears and for actuating said pawls to rotate said gears, and braking means operatively associated with said axle and said wheel for retarding the movement of the cart.

6. A stair-climbing cart comprising a frame, an axle carried by said frame, a wheel mounted on said axle for rotation independent of the rotation of said axle, a second wheel secured to said axle, a gear secured to said first wheel, a second gear secured to said axle and positioned adjacent to said first named gear, pawls for engaging said gears whose normal position is out of engagement with said gears, means for engaging said pawls with said gears, and further means for actuating said pawls to rotate said gears.

7. In a stair-climbing cart having at least two wheels, a driving mechanism comprising a pinion gear adapted to rotate in conjunction with one wheel of the cart, a second pinion gear supported on an axis common with said first named gear and adapted to rotate independently of said first gear and in conjunction with the second wheel of said cart, a manually operated lever which is movable in opposite directions, independent pawls pivotally mounted on said lever and adapted to simultaneously engage each of said gears, stationary stop means engaging said pawls and holding them out of engagement with the pinion gears when the lever is at the extremity of movement in one direction, resilient means carried by the lever and biasing said pawls into engagement with the pinion gears when the pawls are moved away from the stop means, and a second resilient means connected to said lever for normally biasing the lever in one direction to bring the pawls into engagement with the stop means.

8. A carrying cart comprising a frame, an axle carried by said frame, a first wheel secured to said axle, a second wheel carried by said axle but whose movement is independent of the movement of the axle, an engaging surface carried by each of said first and second wheels, engaging means normally held out of contact with said surface, means operatively associated with said engaging means for moving said engaging means into engagement with said surface and for actuating said engaging means for rotating said first and second wheels, and braking means operatively associated with each of said wheels for retarding the rotation thereof.

9. A stair-climbing cart comprising a frame, an axle carried by said frame, a first wheel secured to said axle, a second wheel mounted for free rotation on said axle, a driving mechanism comprising a pinion gear secured to said second wheel, a second pinion gear secured to said axle, a manually operated lever which is movable in opposite directions, a pin passing through said lever, pawls pivotally mounted on said pin and carried by said lever and adapted to simultaneously engage each of said gears, stationary stop means engaging said pawls and holding them out of engagement with the pinion gears when the lever is at the extremity of movement in one direction, resilient means carried by the lever and biasing said pawls into engagement with the pinion gears when the pawls are carried by the lever away from the stop means, a second resilient means connected to said lever for normally biasing the lever in one direction to bring the pawls into engagement with the stop means, and a braking mechanism comprising a brake controlling the movement of said second wheel and a brake controlling the movement of said axle.

10. A stair-climbing cart comprising a frame, an axle carried by said frame, a brake drum secured to said axle, a gear carried by said brake drum, a wheel mounted for free rotation upon said axle, a second brake drum secured to said wheel, a second gear carried by said second brake drum, dependent pawl means for simultaneously engaging said first and second named gears, means for actuating said pawl means for rotating said wheel and said axle, and braking means engaging said first and second named brake drums.

11. A stair-climbing cart comprising a frame, an axle carried by said frame, a first wheel secured to said axle, a second wheel mounted for free rotation on said axle, a driving mechanism for moving said cart up a flight of stairs comprising a gear secured to said second wheel, a second gear secured to said axle, a manually operated lever which is movable in opposite directions, a pin passing through said lever, pawls pivotally mounted on said pin and carried by said lever and adapted to simultaneously engage each of said first and second named gears, stationary stop means engaging said pawls and holding them out of engagement with the gears when the lever is at the extremity of movement in one direction, resilient means carried by the lever and biasing said pawls into engagement with said gears when the pawls are carried away by the lever from the stop means, a second resilient means connected to said lever for normally biasing the lever in one direction to bring the pawls into engagement with the stop means, and a braking mechanism for controlling the movement of said cart down a flight of stairs comprising a brake drum secured to said axle, a second brake drum secured to said second wheel, two arc-shaped brake shoes, brake linings carried by said shoes for engaging the first and second named brake drums, a stationary pin connecting said brake shoes at one extremity of each shoe, a second pin movable with respect to said first named pin connecting said brake shoes at their other extremities, and a lever carried by the frame of said cart and connected to said second pin for moving the brake linings simultaneously into engagement with their respective brake drums.

12. In a cart of the class described, in combination, an axle, two wheels carried by said axle, a circular member having a first portion which is formed as a gear and a second portion which is formed as a brake drum mounted upon said axle, a first movable member adapted to engage the geared portion of said circular member for arcuately rotating said circular member in only one direction, means adapted to engage said first movable member for normally holding it out of engagement with said circular member, a second movable member adapted to engage the brake drum portion of said circular member in alternate correlation with said first member to prevent said circular member from rotating in a direction opposite from the direction of rotation motivated by said first movable member, and independent operating means for actuating both the first movable member and the second movable member.

13. A stair climbing cart, comprising a frame, ground-engaging wheels supported on said frame for independent rotation, a brake drum operably connected to each wheel for rotation with the respective wheel, a gear operably connected to each wheel for rotation with the respective wheel, said drums and gears disposed substantially adjacent each other and coaxial with the wheels, manually operated pawl means engageable with both of said gears and rotatable about the axis of said gears to procure simultaneous rotation of said gears, cam means engageable with said pawl means and operable to disengage said pawl means from said gears when said pawl means is in one position, and manually operated normally inactive brake means engageable with both of said brake drums to simultaneously retard rotation of said supporting wheels.

14. A stair climbing cart, comprising a frame, ground-engaging wheels supported on said frame for independent rotation, a brake drum operably connected to each wheel for rotation with the respective wheel, a gear operably connected to each wheel for rotation with the respective wheel, said drums and gears disposed substantially adjacent each other and coaxial with the wheels, a pair of pawls each biased to engage one of said gears, means for normally holding said pawls out of engagement with their respective gears, a lever coaxially pivoted with respect to said gears for movement independent of the movement of said wheels, said lever being connected to said pawls, the movement of said lever in one direction moving said pawls from their normal position and into engagement with said gears to rotate said wheels in one direction, and brake means engageable with said brake drums for retarding the movement of said wheels.

15. A stair climbing cart, comprising a frame, ground-engaging wheels supported on said frame for independent rotation, a brake drum operably connected to each wheel for rotation with the respective wheel, a gear operably connected to each wheel for rotation with the respective wheel, said drums and gears disposed substantially adjacent each other and coaxial with the wheels, manually operated pawl means engageable with both of said gears and rotatable about the axis of said gears to procure simultaneous rotation of said gears, cam means engageable with said pawl means and operable to disengage said pawl means from said gears when said pawl means is moved to one position, and manually operated normally inactive brake means engageable with both of said brake drums to simultaneously retard rotation of said supporting wheels.

References Cited in the file of this patent

UNITED STATES PATENTS

| | | |
|---|---|---|
| 296,937 | Davies | Apr. 15, 1884 |
| 414,046 | Huggins | Oct. 29, 1889 |
| 1,609,685 | Bidin | Dec. 7, 1926 |
| 2,116,825 | Crescent | May 10, 1938 |
| 2,488,766 | De Moss | Nov. 22, 1949 |
| 2,633,363 | Marshall | Mar. 31, 1953 |

FOREIGN PATENTS

| | | |
|---|---|---|
| 187,291 | Germany | June 24, 1907 |
| 318,678 | Great Britain | Sept. 12, 1929 |